Figure 25:
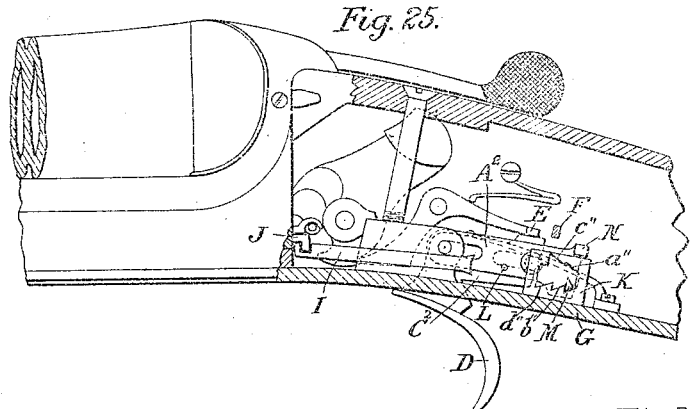

No. 756,896. PATENTED APR. 12, 1904.
J. ROBERTSON.
SINGLE TRIGGER MECHANISM FOR DROP DOWN GUNS.
APPLICATION FILED JULY 24, 1903.
NO MODEL. 3 SHEETS—SHEET 1.
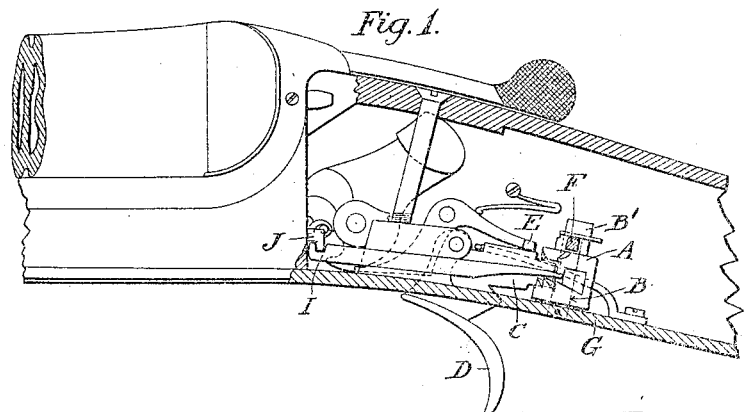
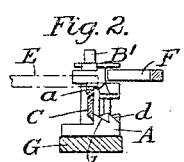
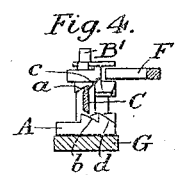
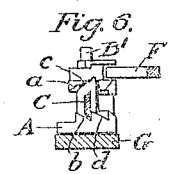
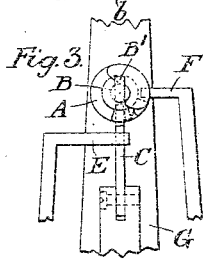
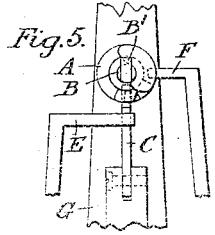
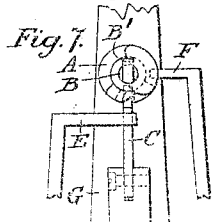
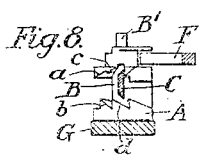
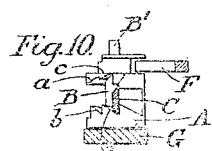
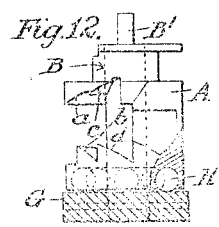
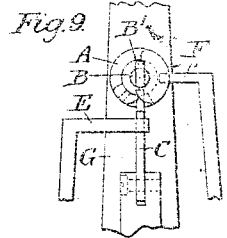
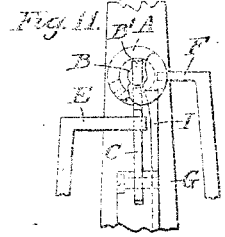
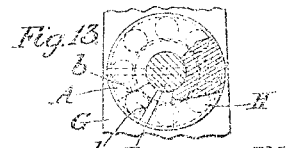

No. 756,896. PATENTED APR. 12, 1904.
J. ROBERTSON.
SINGLE TRIGGER MECHANISM FOR DROP DOWN GUNS.
APPLICATION FILED JULY 24, 1903.
NO MODEL. 3 SHEETS—SHEET 2.
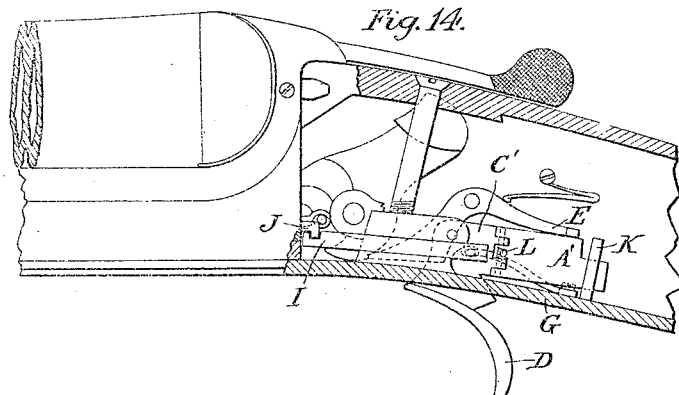
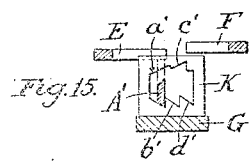
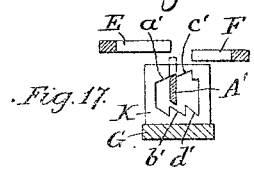
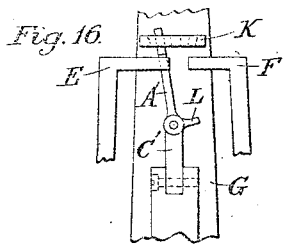
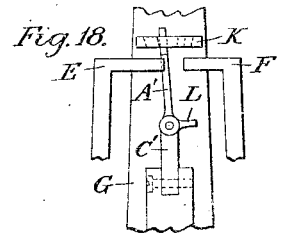
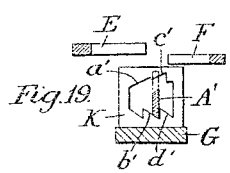
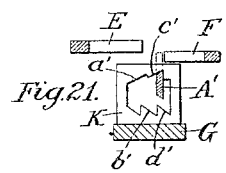
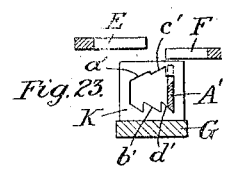
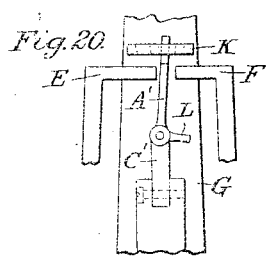
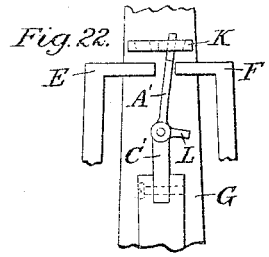
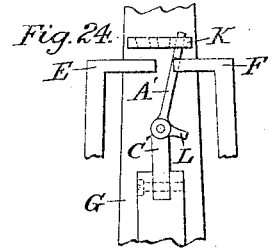
Witnesses:
M. J. Dixon
W. R. Berry
INVENTOR:
John Robertson,
By Henry H. Bates
Attorney.

No. 756,896. PATENTED APR. 12, 1904.
J. ROBERTSON.
SINGLE TRIGGER MECHANISM FOR DROP DOWN GUNS.
APPLICATION FILED JULY 24, 1903.
NO MODEL. 3 SHEETS—SHEET 3.

Witnesses:
M. J. Dixon
W. R. Berry

INVENTOR:
John Robertson
By Henry H. Bates
Attorney.

Patented April 12, 1904.

UNITED STATES PATENT OFFICE.

JOHN ROBERTSON, OF LONDON, ENGLAND.

SINGLE-TRIGGER MECHANISM FOR DROP-DOWN GUNS.

SPECIFICATION forming part of Letters Patent No. 756,896, dated April 12, 1904.

Application filed July 24, 1903. Serial No. 166,887. (No model.)

*To all whom it may concern:*

Be it known that I, JOHN ROBERTSON, gunmaker, a subject of the King of Great Britain, trading as Boss & Co., residing at 73 St. James street, Pall Mall, London, in the county of Middlesex, England, have invented new and useful Improvements in Single-Trigger Guns, of which the following is a specification.

The present invention relates to improvements in what are known as "double-barreled single-trigger drop-down" guns of the class described and claimed in the specification of my prior patent, No. 582,094, dated May 4, 1897, and in which suitable means are provided whereby the recoil after the discharge of the first barrel or unintentional release of and subsequent pull on the trigger is prevented from discharging the second barrel, this effect being secured by arranging suitable interposing surfaces to the travel of the part which is shifted from the position it occupies when the first barrel is to be discharged to that necessary for firing the second barrel, so that the trigger has to be subjected to three pulls, one of which is involuntary and due to the recoil from the first discharge.

In the arrangement described and claimed in the prior patent above referred to the shifting part discharging the second barrel was acted upon by a spring tending to move same to the required position, but the movement of which was opposed by certain interposing surfaces which were released or removed by the successive movements of the trigger. It has been found in practice that the spring acting on the shifting part may occasionally fail to act effectively or may be broken and so render the gun inoperative; and the object of the present invention is to overcome these possible defects. For this purpose I propose to abolish entirely the spring hitherto employed to shift the movable part to the position for actuating the second barrel and in place thereof to employ a series of suitable inclines, which under the pull of the trigger are caused to positively shift such part to the position which enables the next pull on the trigger to cause the sear of the second barrel to be acted upon and so discharge the latter.

Figure 26:
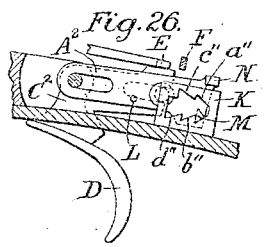
Figure 28:
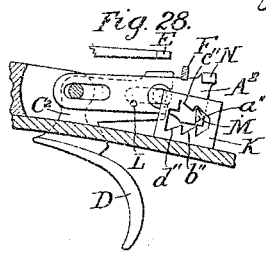
Figure 30:
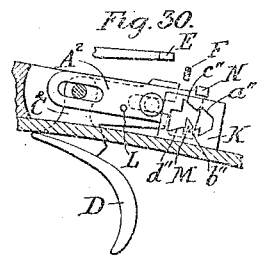
Figure 27:
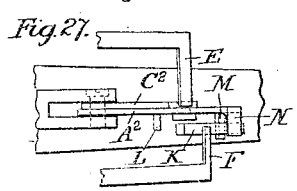
Figure 29:
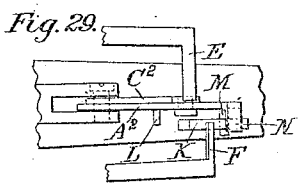
Figure 31:
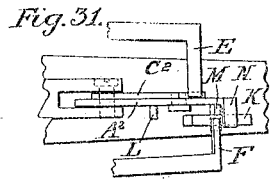
Figure 32:
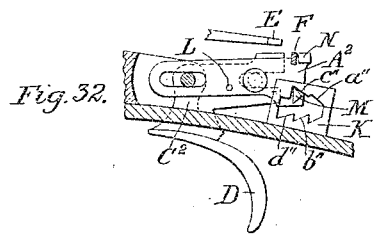
Figure 34:
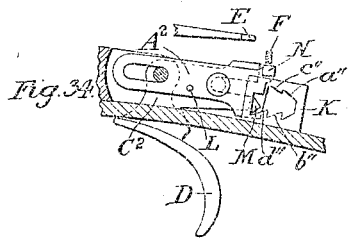
Figure 33:
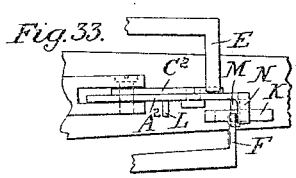
Figure 35:
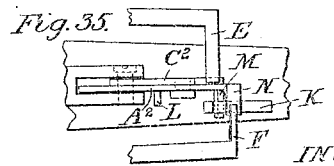

In the accompanying drawings, Figures 1 to 13, inclusive, illustrate the application of the invention to an action in which the shifting part consists of a tumbler carrying the inclined surfaces which are acted upon by the trigger. Figs. 14 to 24 show its application to a gun in which the shifting part consists in a tailpiece hinged to the trigger proper and acted upon by fixed inclined surfaces in the gun action in following the movements of the trigger under the successive pulls thereon, while Figs. 25 to 35 show its application to a gun in which the shifting part is mounted upon the trigger proper, so as to be capable of a longitudinal movement in relation to the trigger, such movement being imparted thereto by fixed inclined surfaces with which the shifting part is brought into contact in following the movements of the trigger under the successive pulls thereon.

The three arrangements above mentioned, consisting of (first) a tumbler, (second) a tailpiece hinged to the trigger, and (third) a part capable of longitudinal movement in relation to such trigger, are known ways of mounting a movable part for actuating the sear of the second barrel of a double-barrel gun under the successive movements of a single trigger, and the present invention consists solely in the substitution of inclined surfaces for shifting such movable part positively in place of the spring hitherto employed for shifting the same when certain impeding or obstructing surfaces have been removed from its path of travel under the successive pulls on the trigger.

Referring to Figs. 1 to 13, the tumbler A, which is mounted so that it can be made to partially rotate upon the stud or pillar B, as well as to slide vertically thereon when in certain positions, is provided with inclined surfaces *a*, *b*, *c*, and *d*, between which the end of the trigger-blade C is situated and which latter when actuated by the pull on or release of the trigger D comes into contact with one or other of the inclined surfaces, and so imparts a positive movement to the tumbler. Figs. 2 and 3 are respectively a vertical section and plan view of the tumbler A, trigger-blade C, and the sears E and F for discharging the two barrels, showing such parts in the positions they occupy when the gun is ready for the discharge of the first barrel. It will be seen that the sear E of the right-hand barrel extends over the trigger-blade C and so will be raised on the first pull on the trigger D. This first movement will bring the end of the trigger-blade C into contact with the inclined surface $a$ on the tumbler A and so cause such tumbler to turn on its pivot B until at the termination of the first pull the tumbler will have been shifted to the position indicated in Figs. 4 and 5. The involuntary release due to the recoil of the gun then taking place, the lower edge of the end of the trigger-blade C will come into contact with inclined surface $b$ on the tumbler A, which will thereby be turned until it assumes the position indicated in Figs. 6 and 7. By the involuntary pull on the trigger D, which next occurs, the upper edge of the end of the trigger-blade C is brought into contact with the inclined surface $c$ on the tumbler A, whereby the latter will be turned still farther on its pivot to the position shown in Figs. 8 and 9. The trigger D being then fully and intentionally released, the end of its blade C will in its downward movement act on the inclined surface $d$ on the tumbler A, which latter will thus be turned to the position shown in Figs. 10 and 11, in which position it is free to move vertically upward on its pivot B on a further pull on the trigger to cause the discharge of the second barrel. Until the tumbler A assumes the position shown in Figs. 10 and 11 it is prevented from rising vertically on its pivot B by means of a lateral extension B′ of the latter bearing on the upper surface of the tumbler; but when in the position indicated in such figures a recessed or cut-away part of the tumbler comes beneath said extension B′ and so allows the tumbler to be raised on the next pull on the trigger, and thus operate the sear F of the second or left-hand barrel, thereby discharging the latter. Figs. 12 and 13 are respectively an elevation (partly in section) and cross-section of the tumbler A, both drawn to an enlarged scale, and show the same provided with a ball-bearing H in its under surface to reduce the friction and enable such tumbler to turn on its pivot with the greatest ease in relation to the trigger-plate G. Any well-known means may be provided for moving the tumbler back to its normal position—$i.\ e.$, the position in which the first barrel will be discharged on the next pull on the trigger—such, for instance, as that shown in Figs. 1 and 11—consisting in a bar or rod I, connected at one end to the bolt J, by which the gun is opened for recharging, the other end of such rod during the movement of opening the gun acting against the tumbler A and turning it on its pivot B back from the position shown in Figs. 10 and 11 to that shown in Figs. 2 and 3.

In the arrangement shown in Figs. 14 to 24, inclusive, it will be seen that the tailpiece or tumbler A′ is pivoted to the rear end of a short trigger-blade C′ instead of on the trigger-plate G and that the inclined surfaces $a'$ $b'$ $c'$ $d'$ are formed on a plate K, mounted vertically across the trigger-plate G. The operation of the parts is substantially the same as in the arrangement shown in Figs. 1 to 13, the first pull on the trigger D after raising the sear E of the first barrel causing, by means of the inclined surface $a'$, the tailpiece A′ to turn from the position shown in Figs. 15 and 16 to that shown in Figs. 17 and 18, the following involuntary release then by means of the inclined surface $b'$ turning it to that indicated in Figs. 19 and 20, while the next ensuing or the involuntary pull will cause the tailpiece A′ by coming in contact with the inclined surface $c'$ to turn still farther until it reaches the position shown in Figs. 21 and 22, when on the trigger being fully released the tailpiece A′ by contact with the inclined surface $d'$ will, as shown in Figs. 23 and 24, be turned into position beneath the sear F of the second barrel, which latter will thus be discharged on the next pull on the trigger. Any well-known means operated, for instance, by the bolt J and a bar or rod I, as in the previous arrangement, may be employed for returning the tailpiece A′ to its normal position. In Fig. 14 a pin L is shown, against which the end of the bar or rod I abuts when the gun is being opened for recharging, and which thus turns the tailpiece or tumbler on its pivot in the trigger-blade C′ back to the position shown in Figs. 15 and 16.

Another substantially similar arrangement for carrying out the invention is shown in Figs. 25 to 35, inclusive. In this case it will be seen that the movable part A², which is shifted by the different pulls on the trigger D to the position for discharging the second barrel, is arranged so that it is capable of sliding longitudinally in relation to the trigger-blade C² and is lifted by each pull on the trigger. The plate K, in which the inclined surfaces $a''$ $b''$ $c''$ $d''$ are formed, is in this case situated on the trigger-plate G longitudinally in relation thereto, and an arm or projection M on the sliding part A² acts in conjunction with such inclined surfaces to cause such sliding part to move from the position indicated in Figs. 26 and 27 under the influence of the surface $a''$ when the trigger is pulled to discharge the first barrel to that shown in Figs. 28 and 29, thence on the involuntary release, through the action of the inclined surface $b''$, to that shown in Figs. 30 and 31, subsequently on the involuntary pull to the position indicated in Figs. 32 and 33, and finally when the latter pull is fully and intentionally released to the position shown in Figs. 34 and 35, in which latter position an arm N on the shifting part $A^2$ will then be situated beneath the sear F of the second barrel, so that on the trigger being again pulled said second barrel will be discharged. The sliding part $A^2$ may be returned to its normal position, as in the previous arrangement, by a bar or rod I, operated from the barrel-lock J and acting against a pin L, fixed to the sliding part.

What I claim as my invention, and desire to secure by Letters Patent, is—

1. In a double-barreled single-trigger gun, in combination, a single trigger, sears operated by said trigger in succession, for discharging the right and left barrels respectively, a member having a series of inclines, interposed between said trigger and the second sear, and a device operated by the trigger between the trigger and said inclines, for engagement with said inclines in succession, whereby the action of the trigger upon the second sear is delayed until the last incline has been engaged, thereby preventing the premature discharge of the second barrel, substantially as shown and described.

2. In a double-barreled single-trigger gun, in combination, a single trigger, sears operated by said trigger in succession, for discharging the right and left barrels respectively, a pivoted revoluble tumbler having a series of inclined serrations, and a tailpiece on the trigger engaging said inclined serrations in succession, the range of movement of said tailpiece being restricted by said serrations until the last one has been engaged, whereby the premature discharge of the second barrel is prevented, substantially as shown and described.

In testimony whereof I have signed my name to this specification in the presence of two subscribing witnesses.

JOHN ROBERTSON.

Witnesses:
   Chas. A. Allison,
   Harry A. McLellan.